Jan. 23, 1923.

B. F. McGOVERN.
DIE HEAD.
FILED APR. 4, 1921.

Inventor

Bernard F. McGovern

By R. S. Trogner
Attorney

Jan. 23, 1923.
B. F. McGOVERN.
DIE HEAD.
FILED APR. 4, 1921.
1,443,324
2 SHEETS-SHEET 2
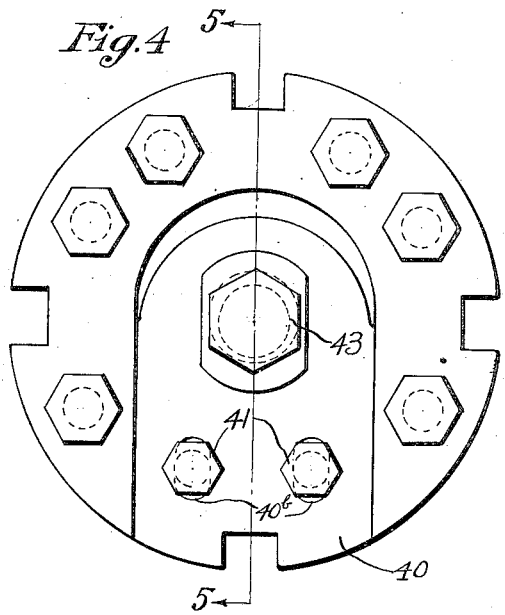
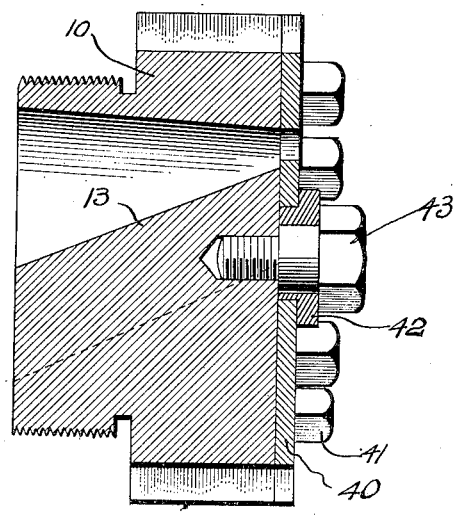
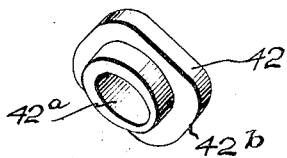
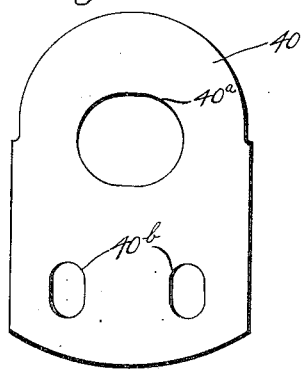
Inventor
Bernard F McGovern
By R. S. Trogner
Attorney Patented Jan. 23, 1923.                                           1,443,324

UNITED STATES PATENT OFFICE.

BERNARD F. McGOVERN, OF AKRON, OHIO, ASSIGNOR TO THE GOODYEAR TIRE & RUBBER COMPANY, OF AKRON, OHIO, A CORPORATION OF OHIO.

DIE HEAD.

Application filed April 4, 1921. Serial No. 458,316.

*To all whom it may concern:*

Be it known that I, BERNARD F. MCGOVERN, a citizen of the United States, residing at Akron, in the county of Summit and State of Ohio, have invented new and useful Improvements in Die Heads, of which the following is a specification.

My invention relates to die heads for extruding machines, and it has for its object to provide an improved form of die head for tube machines.

Heretofore, die heads of this general type have employed a central core that is retained within the die head by a spider or similar supporting means, whereas, in a die head constructed in accordance with my invention, no such spider or supplemental core is necessary.

Further objects and advantages to be obtained from practicing my invention will become apparent from a perusal of this description in conjunction with the accompanying drawings, in which:

Fig. 4 is an end elevational view of a modified form of die head constructed in accordance with my invention;

Fig. 5 is a sectional view of the die head shown in Fig. 4; and

Figs. 6 and 7 are detail views of certain of the die parts.

Figure 1:
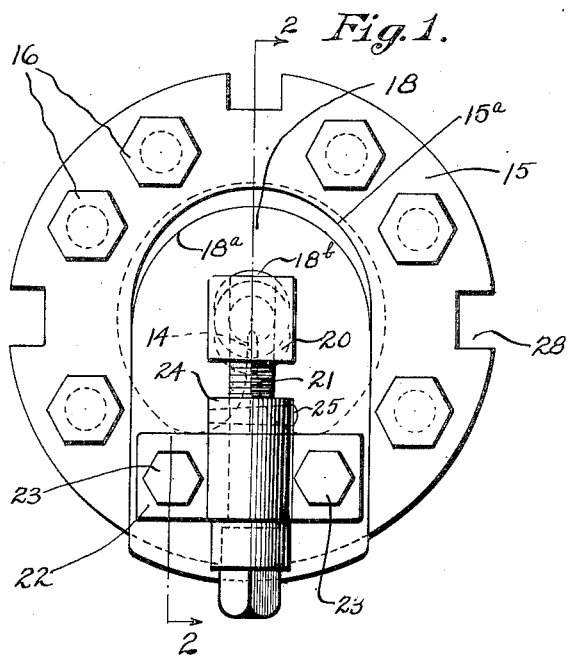
Fig. 1 is an end elevational view of a die head constructed in accordance with my invention.
Figure 2:
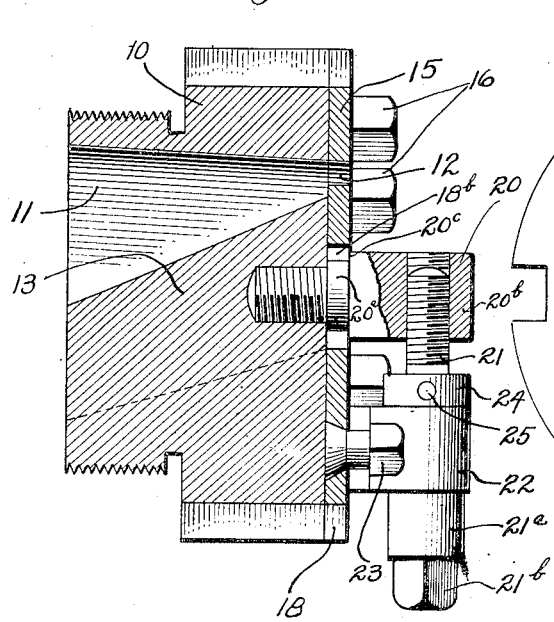
Fig. 2 is a sectional view, with parts shown in elevation, of the die head illustrated in Fig. 1. This view is taken substantially on the line 2—2 of Fig. 1.
Figure 3:
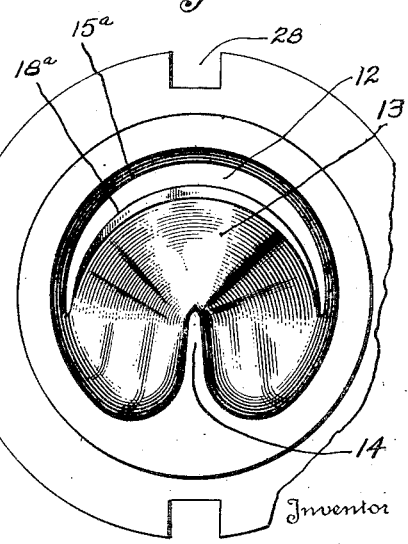
Fig. 3 is an end elevational view of the die head, looking in the direction of the extruding opening from the rear of the die head.

The die heads shown in Figs. 1, 2 and 3 of the drawings embodies a member 10 through which plastic material is forced in accordance with well established practice in this art. The member 10 has an opening 11 that is adapted to first receive the plastic material, and an opening 12 that is of substantially the form of the cross-section of the material to be shaped by the die. A core portion 13 is formed integrally with the member 10 and merges the opening 12 with the opening 11 through its gradually sloping side walls. The core 13 is tapered toward the opening 11 and terminates in a tongue 14 that first engages the plastic material when it is forced into the die head. The sloping walls of the member 10 serve to gradually shape the plastic material to the form of the opening 12.

A die plate 15 is secured to the outer face of the die head by means of a plurality of lugs 16. The engaging edge or lip $15^a$ of the plate substantially registers with the upper surface of the extruding opening 12. An adjustable plate 18 is slidably mounted on the die head and embodies a lip $18^a$ that is adjustable relative to the lip $15^a$ of the plate in such manner as to change the extruding opening.

The plate 18 is held in place against the die head by means of a lug 20, the shank $20^a$ of which extends through a slot $18^b$ in the plate 18 and is screwed into the core portion 13 of the die head. The head $20^b$ of the bolt is transversely threaded to receive an adjusting screw 21 that serves to raise and lower the plate 18. The laterally extending shoulders $20^c$ maintain the die plate 18 snugly against the face of the die head. A bracket 22, in which the screw 21 is journaled, is secured to the plate 18 by means of lugs 23.

The lower portion of the adjusting bolt 21 has an enlarged shoulder $21^a$ and a bolt head $21^b$ that is employed for turning the lug. A collar 24, which is secured to the screw 21 by means of a transverse pin 25, retains the adjusting screw 21 within the bracket 22.

A die head constructed in accordance with my invention is attached to an extruding machine in accordance with the usual practice. The size or form of the opening through which the plastic material is forced is adjusted by means of the bolt head $21^b$. It will readily be understood that the operation of the bolt 21 raises or lowers the adjusting plate 18 relative to the fixed plate 15 of the die head. A series of indentures 28 are formed around the periphery of the die head in order to facilitate its mounting on the extruding machine by affording a purchase for a wrench.

Figs. 4 to 7, inclusive, show a modified form of my invention in which a different form of adjustable plate 40 is employed to alter the extruding opening of the die head. The remaining portions of this die head are similar to the die head shown in Figures 1, 2 and 3 and are correspondingly numbered.

The plate 40, which is shown in detail in Fig. 7 of the drawings, embodies an opening 40ª that is of greater width than depth, and a pair of slots 40ᵇ that are located near the bottom of the plate and are adapted to receive a pair of lugs 41.

The mechanism for adjusting the plate 40 embodies an eccentric collar 42 that is shown in detail in Fig. 6, and a lug 43 that extends through the collar 42 into the core 13 of the die.

The lug 43 is located along the median line of the plate 40 and, when clamped in position, holds the plate and the collar 42 securely against the core 13.

Adjustment of the plate 40 is effected by loosening the lugs 41 and turning the collar 42. The opening 42ª through the center of the collar 42 is eccentric with respect to the shoulder 42ᵇ that fits within the opening 40ª of the plate 40. Therefore, if the collar 42 is turned on the lug 43, its eccentricity raises or lowers the plate 40 in accordance with the degree of turn given to the collar 42. The plate is then firmly secured in place by tightening the lug 43 and the auxiliary clamping lugs 41.

In extruding machines that are employed for use with plastic materials of very low viscosity, if a spider or core-retaining structure is interposed in the path of the material, it greatly impedes the flow of material through the extruding machine and also causes a disturbance of the uniform texture of the material. By the use of my invention, this spider or core-holding structure is dispensed with and the core is formed integrally with the body of the die head. Therefore, as the plastic material is fed in a substantially uniform mass to the die head, it is gradually shaped to the cross-sectional form of the extruding opening by means of the tongue 14 of the core and the gradually sloping walls of the member 10. The strain on the die head from the pressure of the extruded material is, therefore, minimized and the material that reaches the extruding opening is maintained uniformly free from air pockets, folds or seams.

The forms of mechanism for adjusting the die plate to provide changes in the extruding opening are merely indicative of the large number of variations and modifications in such structures that may be provided. I, therefore, desire that only such limitations shall be imposed on the spirit and scope of my invention as are set forth in the accompanying claims.

What I claim is:

1. A die head for tubing machines embodying a member through which plastic material may be forced, and a core formed integrally with the member.

2. A die head for tubing machines embodying a member through which plastic material may be forced, a core formed integrally with the member, and means for controlling the form of cross-section of the extruded material.

3. A die head for tubing machines embodying a member through which plastic material may be forced having a core, a substantially circular opening for receiving the material to be extruded and a substantially crescent-shaped die opening formed by a core, said core being integral with said member and so formed as to merge the extruding opening with the receiving opening, and an auxiliary die plate having an adjustable opening therein that is adapted to register with the opening of the die head.

4. A die head for tubing machines embodying a member through which plastic material may be forced, a core for the die head formed integrally with said member, a plate secured to the outer face of the die and adapted to register with one side of the opening through the die head, and a second element movable relative to the plate and adapted to enlarge or restrict the extruding opening.

5. The combination with a die head having an extruding opening therethrough, of a die plate, an auxiliary plate adapted to be secured to the outer face of the die head and having an outer face adapted to register with one side of the extruding opening, a second plate positioned in slidable relation with the first plate and adapted to alter the size of the extruding opening, and means for operating the second plate.

In witness whereof I have hereunto signed my name in the presence of two subscribing witnesses.

BERNARD F. McGOVERN.

Witnesses:
 B. J. McDanel,
 J. E. Keating.